United States Patent
Yu et al.

(10) Patent No.: US 12,541,986 B2
(45) Date of Patent: Feb. 3, 2026

(54) ANNOTATION ALIGNMENT FOR CHARACTER RECOGNITION IN DOCUMENTS

(71) Applicant: SAP SE, Walldorf (DE)

(72) Inventors: Xiang Yu, Berlin (DE); Christoph Meyer, Berlin (DE)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 18/231,652

(22) Filed: Aug. 8, 2023

(65) Prior Publication Data

US 2025/0054325 A1 Feb. 13, 2025

(51) Int. Cl.
| | |
|---|---|
| *G06V 30/14* | (2022.01) |
| *G06F 40/284* | (2020.01) |
| *G06V 10/70* | (2022.01) |
| *G06V 30/19* | (2022.01) |
| *G06V 30/414* | (2022.01) |

(52) U.S. Cl.
CPC ........ *G06V 30/1448* (2022.01); *G06F 40/284* (2020.01); *G06V 10/70* (2022.01); *G06V 30/19147* (2022.01); *G06V 30/414* (2022.01)

(58) Field of Classification Search
None
See application file for complete search history.

(56) References Cited

U.S. PATENT DOCUMENTS

| | | | | |
|---|---|---|---|---|
| 11,328,524 | B2* | 5/2022 | Cristescu | G06V 30/414 |
| 2015/0026556 | A1* | 1/2015 | Stadermann | G06F 40/183 |
| | | | | 715/227 |
| 2016/0132738 | A1* | 5/2016 | Biegert | G06V 30/412 |
| | | | | 382/182 |
| 2017/0337167 | A1* | 11/2017 | Byron | G06F 16/93 |
| 2020/0302208 | A1* | 9/2020 | Hoehne | G06N 3/08 |
| 2024/0078376 | A1* | 3/2024 | Li | G06F 16/583 |
| 2024/0404304 | A1* | 12/2024 | Modem | G06V 20/70 |

* cited by examiner

*Primary Examiner* — Andrew H Lam
(74) *Attorney, Agent, or Firm* — Klarquist Sparkman, LLP

(57) ABSTRACT

Systems and processes for aligning weakly-annotated data to recognized characters in a document are provided. In a method for aligning annotation data to recognized characters, annotation words and character recognition tokens are received, and a search algorithm is performed to align the annotation words to the tokens in a stepwise manner. At each step, an annotation word is aligned to one or more tokens, and a cost of each respective alignment is calculated. Once all annotation words are aligned, a full set of annotation word-token pairs corresponding to the annotation is selected based on a total cost of alignment for that set. A bounding box enclosing the tokens in the selected full set is generated and output to a target application.

20 Claims, 7 Drawing Sheets

ANNOTATION ALIGNMENT FOR CHARACTER RECOGNITION IN DOCUMENTS

BACKGROUND

Optical character recognition (OCR), intelligent character recognition (ICR), and/or other content extraction mechanisms can be performed on digital documents in order to generate machine-readable representations of the content in the documents that allow for further computer processing based on and/or using the extracted content. In some machine learning models for document information extraction tasks, training labels are used, which include both the content to be extracted (e.g., some invoice number) and a bounding box localizing it on the document. Such annotations are also referred to as strong annotations. The input for such models is typically constructed from the output of an OCR engine (individual OCR tokens), which is then aligned with the label information. Using the bounding boxes of the strong annotations, this alignment can be computed by using some measure of overlap between the bounding boxes of the OCR tokens and the bounding boxes of the strong annotations.

However, applications, such as the above-described models, that use strong annotation severely limit the amount of training data that is available. Typically, the strong annotations are created by human annotators who manually generate the bounding boxes for annotated content, which is both costly and time-consuming. Data without bounding boxes for the labels, referred to as weakly annotated data, on the other hand is available in much larger quantities as this data can be extracted from Enterprise Resource Planning (ERP) systems that store the information that was extracted from business documents (in most cases by humans). However, in these contexts, the weak annotations would not include bounding boxes, as they are not relevant for ERP. Accordingly, there remains a need for improved technologies to generate bounding boxes used for strong annotations of document content with reduced human interaction and resources relative to the typical strong annotation processes described above.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for aligning annotations with character recognition tokens for a document to determine a location of the annotations in the document. In some examples, the disclosed technologies can be implemented as computer-readable media storing instructions which, when executed by one or more hardware processors, cause the hardware processors to perform the following actions. Tokens are received, from a character recognition engine, identifying recognized words in a document. An annotation is received, from an annotation source, to be aligned with the tokens, the annotation comprising a plurality of annotation words. A search algorithm is performed, in a stepwise process for the plurality of annotation words, to align each annotation word of the annotation to a respective token to form a respective annotation word-token pair, the stepwise process including calculating a respective cost indicating a strength of alignment of the respective annotation word-token pair at each step of the stepwise process based on a string similarity of the annotation word and the respective token in the pair and a position of the respective token relative to a prior-aligned token in the stepwise process. A full alignment set is selected for the annotation comprising annotation word-token pairs for each annotation word of the annotation, the full alignment set being selected based on the respective costs of the annotation word-token pairs in the full alignment set. A bounding box is generated, corresponding to a position of the tokens in the full alignment set in the document and associating the bounding box with a location of the annotation in the document. An indication of the location of the annotation in the document is outputted to a target application.

In some examples, the disclosed technologies can be implemented as a method performed by a computer. Tokens identifying recognized words in a document are received from a character recognition engine. An annotation to be aligned with the tokens is received from an annotation source, the annotation comprising a plurality of annotation words. A search algorithm is performed to align the annotation words to the tokens in a stepwise manner wherein, at each step, an annotation word is aligned to one or more tokens, and a cost of each respective alignment is calculated. A full set of annotation word-token pairs corresponding to the annotation is selected based on a total cost of alignment for the selected full set. A bounding box enclosing the tokens in the selected full set is generated, and an indication of the bounding box is output, to a target application, to indicate a position of the tokens in the selected full set within the document.

In some examples, the disclosed technologies can be implemented in a system including one or more hardware processors with coupled memory, and computer-readable media storing instructions executable by the one or more hardware processors. The instructions include first, second, third, fourth, fifth, sixth, seventh, eighth, and ninth instructions. The first instructions, when executed, cause tokens identifying recognized words in a document to be received from a character recognition engine. The second instructions, when executed, cause an annotation to be aligned with the tokens to be received from an annotation source, the annotation comprising a plurality of annotation words. The third instructions, when executed, cause a first set of annotation words of the annotation having a label L to be gathered. The fourth instructions, when executed, cause a search algorithm to align the annotation words to the tokens in a stepwise manner to be performed wherein, at each step, an annotation word of the first set is aligned to one or more tokens to generate an alignment, and a cost of each respective alignment is calculated, the cost being based on a string similarity between the annotation word and the respective token of the one or more tokens and a distance between the respective token and a respective previously-aligned token to a prior annotation word in the annotation. The fifth instructions, when executed, cause the first set of alignments to be sorted based on the respectively calculated cost and iteratively add each alignment having a non-shared token to a list of occurrences for annotation words having the label L. The sixth instructions, when executed, cause a confidence score to be calculated for each of the alignments in the list of occurrences based on an association of the respective token for each of the alignments to the label L using a machine learning model. The seventh instructions, when executed, cause a full set of annotation word-token pairs corresponding to the annotation to be selected based on a total cost of alignment for the selected full set and the confidence score for the alignments of the first set of annotation words. The eighth instructions, when executed, cause a bounding box enclosing the tokens in the selected full set to be generated. The ninth instructions, when executed, cause an indication of the bounding box to be output to a target application to indicate a position of the tokens in the selected full set within the document.

The foregoing and other objects, features, and advantages of the invention will become more apparent from the following detailed description, which proceeds with reference to the accompanying figures.

DETAILED DESCRIPTION

Introduction and Overview

As described above, optical character recognition (OCR) may be used to extract content from digital documents, such as scans of physical documents, digital images of textual content, and/or other documents that include text (as used herein, the term "text" may include letters, numbers, and/or other characters). However, such recognition algorithms typically do not account for a two-dimensional layout of the document, and simply return recognized characters in a line-by-line sequence. In this way, attempting to recognize blocks of text that span portions of multiple lines in a document may be difficult without human annotations. For example, as further described above, strong annotations may be used to designate locations in a document where a targeted annotation (e.g., set of characters or words) is located in the document, however, they utilize direct human interaction to generate bounding boxes for annotation text. Further complications may also arise due to OCR errors, which may return slightly incorrect estimations of text in a document.

This disclosure describes a new approach to provide alignment of OCR tokens with weak annotation text (e.g., annotations that do not provide bounding boxes indicating a location of the text in the document). The disclosed technologies enable bounding boxes for annotations to be generated around OCR tokens matching the annotations without relying upon human annotations indicating the location of the bounding boxes. For example, in accordance with the disclosed technologies, a new annotation alignment service is provided for generating such bounding boxes using OCR token outputs and weak annotations. The disclosed technologies may provide strong annotations for use in a variety of applications, such as training models, generative models, output prediction checkers, and/or other applications that utilize annotations relating to recognized characters in documents.

Example System

Figure 1:
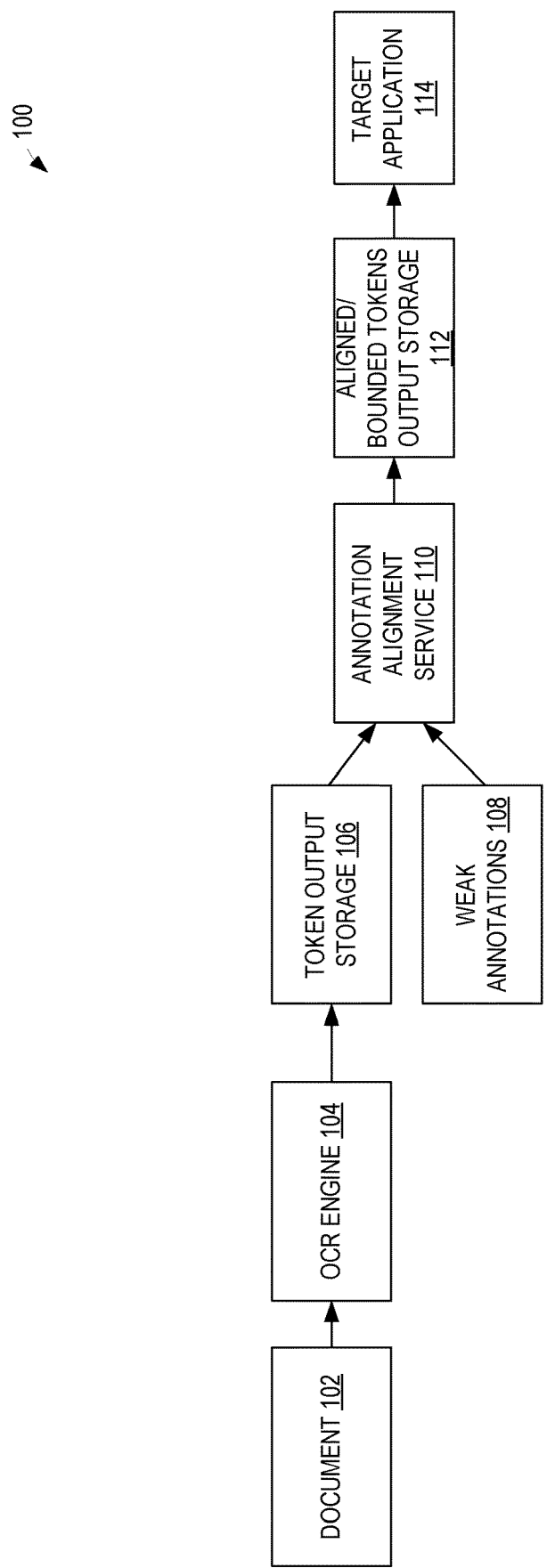
FIG. 1 is a block diagram of an example system for aligning optical character recognition (OCR) tokens with weak annotations to generate strong annotations in accordance with examples of the present disclosure.

FIG. 1 shows an example block diagram of a system 100 for aligning annotations with character recognition token outputs (e.g., to generate strong annotations from weak annotations) in accordance with examples of the present disclosure. In some examples, a document 102 (e.g., a digital computer file including recognizable text) is input to an optical character recognition (OCR) engine 104. It is to be understood that the OCR engine 104 may include any suitable character recognition systems (e.g., computing systems configured to execute instructions and/or otherwise perform the operations described herein) and/or algorithms, including intelligent character recognition (ICR).

The OCR engine 104 may be configured to perform one or more pre-processing operations to condition the data of the document 102 for character recognition, including but not limited to analyzing the document to classify areas as including text (e.g., based on colors in the document, such as classifying light areas as non-text and dark areas as including text), enhancing clarity/image quality by performing one or more image processing operations (e.g., skewing/de-skewing, smoothing, artifact removal, etc. The OCR engine 104 may then execute one or more character recognition algorithms by analyzing the pre-processed document, including performing pattern matching and/or feature recognition to identify characters in the document. In some examples, the OCR engine 104 may perform post-processing operations including generating output relating to the results of the character recognition. For example, as shown in FIG. 1, the OCR engine 104 may output OCR tokens to a token output storage 106.

The token output storage 106 may include a memory or storage device configured to store OCR tokens indicating recognized characters generated by the OCR engine 104 based on the content of the document 102. The tokens may include words (e.g., where the term "word" is used herein in at least some examples to refer to a group of one or more characters including numbers, symbols, letters, etc.) that are included in the document 102, where the tokens are ordered and/or have an indication of a position in the document relative to lines of the document and/or other words in the document.

As shown at 108, weak annotations may be provided to indicate content of the document 102. For example, if the document is known to include an address block, the text of that address block may be provided as a weak annotation for the document. However, as described above, the weak annotation may not include a bounding box or other indication of a location of the corresponding text in the document. The weak annotations 108 may include words, similarly to the OCR tokens. An example of a weak annotation is described in more detail below with respect to FIG. 2. Weak annotations 108 may be provided from a weak annotation source, such as a user (e.g., via manual input), an automated or semi-automated annotation service (e.g., a database including information of the content of a document), and/or other sources.

An annotation alignment service 110 is included in the system 100 to intelligently match words of the weak annotations with the OCR tokens to identify where in the document 102 the text of the weak annotation is located. As a result, aligned and/or bounded tokens may be generated and stored at 112. The aligned and/or bounded tokens may include a representation of the aligned text of the weak annotations 108 and a bounding box corresponding to a location of the OCR tokens determined to be aligned with the weak annotations 108, thus converting the weak annotations into corresponding strong annotations without human intervention to manually generate the bounding boxes. The aligned/bounded tokens in storage 112 may be provided to a target application 114 for further processing involving the document 102. For example, the target application 114 may include a machine learning model configured to accept strong annotations for documents to train the model. In other examples, the target application 114 may include an application that uses a generative model configured to generate weak annotations and/or predictions for documents to display predictions to a user (e.g., the weak annotations 108 may be provided by the generative model and the aligned/bounded tokens output storage 112 may include bounding boxes to be used by the application to enhance the output of the generative model). In still further examples, the target application 114 may include one or more language models and the output stored at 112 may be used to check output prediction of the language models.

Figure 2:
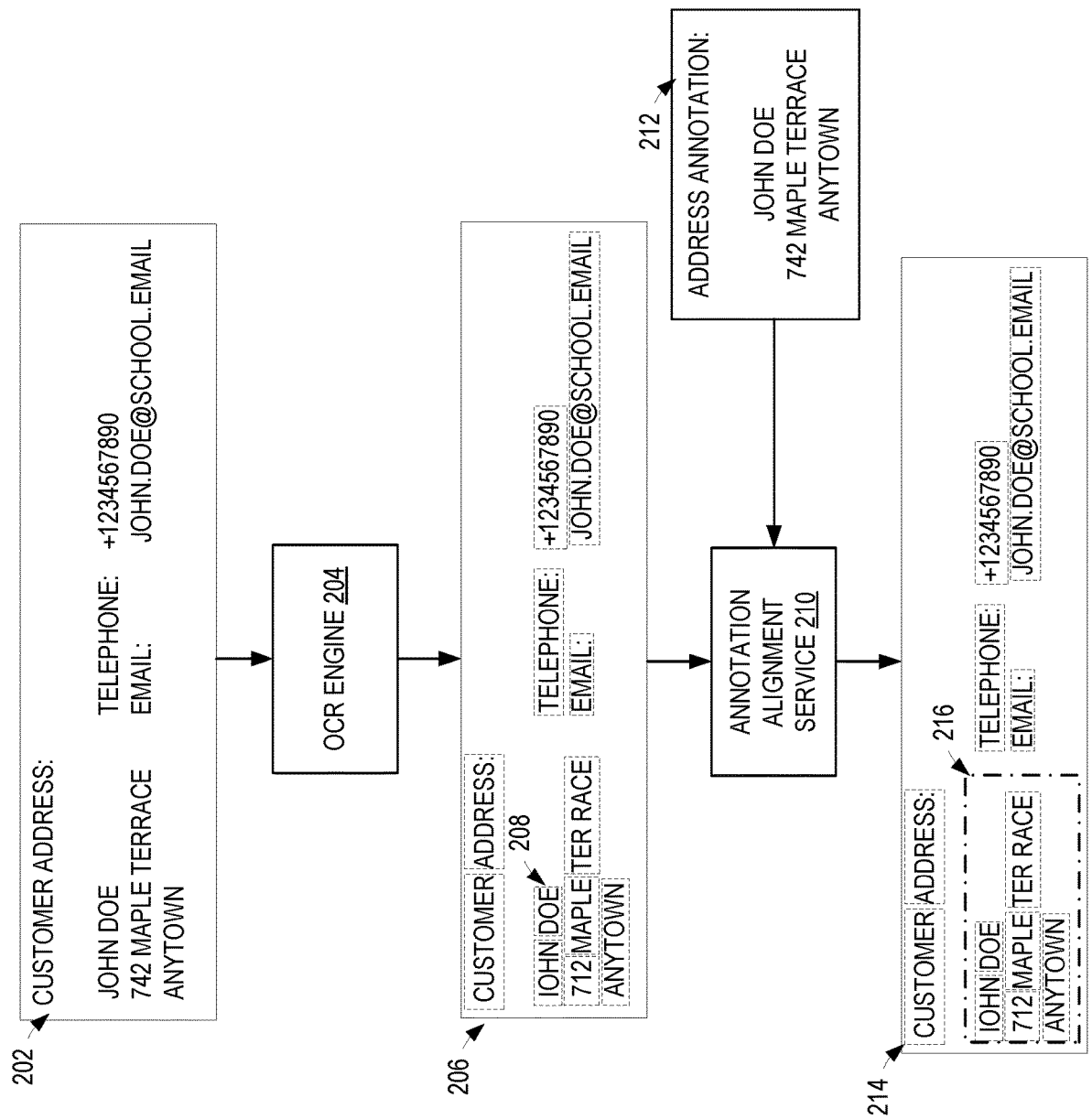
FIG. 2 is an example application of annotation alignment to a document.

FIG. 2 schematically shows how different components of an annotation alignment system, such as system 100 of FIG. 1, may be used to convert weak annotations to strong annotations for a document. As shown, a document 202 may be input into an OCR engine 204 (e.g., an example of OCR engine 104 of FIG. 1). The document 202 includes several different pieces of information, including an individual's name, address, phone number, and email address. The OCR engine 204 may be configured to process the document 202 and attempt to recognize the text content therein (e.g., using the algorithms and/or operations described above with respect to OCR engine 104 of FIG. 1). An example output of the OCR engine is shown at 206, including a plurality of tokens 208 corresponding to recognized words in the document. For example, the second line of the output 206 includes the tokens "IOHN" "DOE" "TELEPHONE:" and "+1234567890." Accordingly, there are some errors in the recognition (e.g., "IOHN" instead of "JOHN" etc.) relative to the input document 202. Nevertheless, as will be described in more detail below with respect to FIGS. 3 and 4, the present disclosure provides mechanisms for aligning words of an annotation with OCR tokens, even accounting for typographical errors.

The output 206 of the OCR engine 204 and a weak annotation 212 (e.g., an address, including a name and street address) are provided to an annotation alignment service 210 for processing. Annotation alignment service 210 may be an example of annotation alignment service 110 of FIG. 1 and may be configured to perform one or more of the associated operations. For example, the annotation alignment service 210 may be configured to match words of the address annotation 212 (e.g., "JOHN" "DOE" "742" "MAPLE" "TERRACE" "ANYTOWN") with one or more respective OCR tokens from the output 206 and determine a best match using a cost function, which will be described in more detail below with respect to FIGS. 3 and 4. As a result, the annotation alignment service 210 may generate a bounding box around the OCR tokens that are matched to the address annotation, such as bounding box 216, and provide an output 214 including the generated bounding box(es).

Example Method—Aligning OCR Tokens with Weakly Annotated Data

Figure 3:
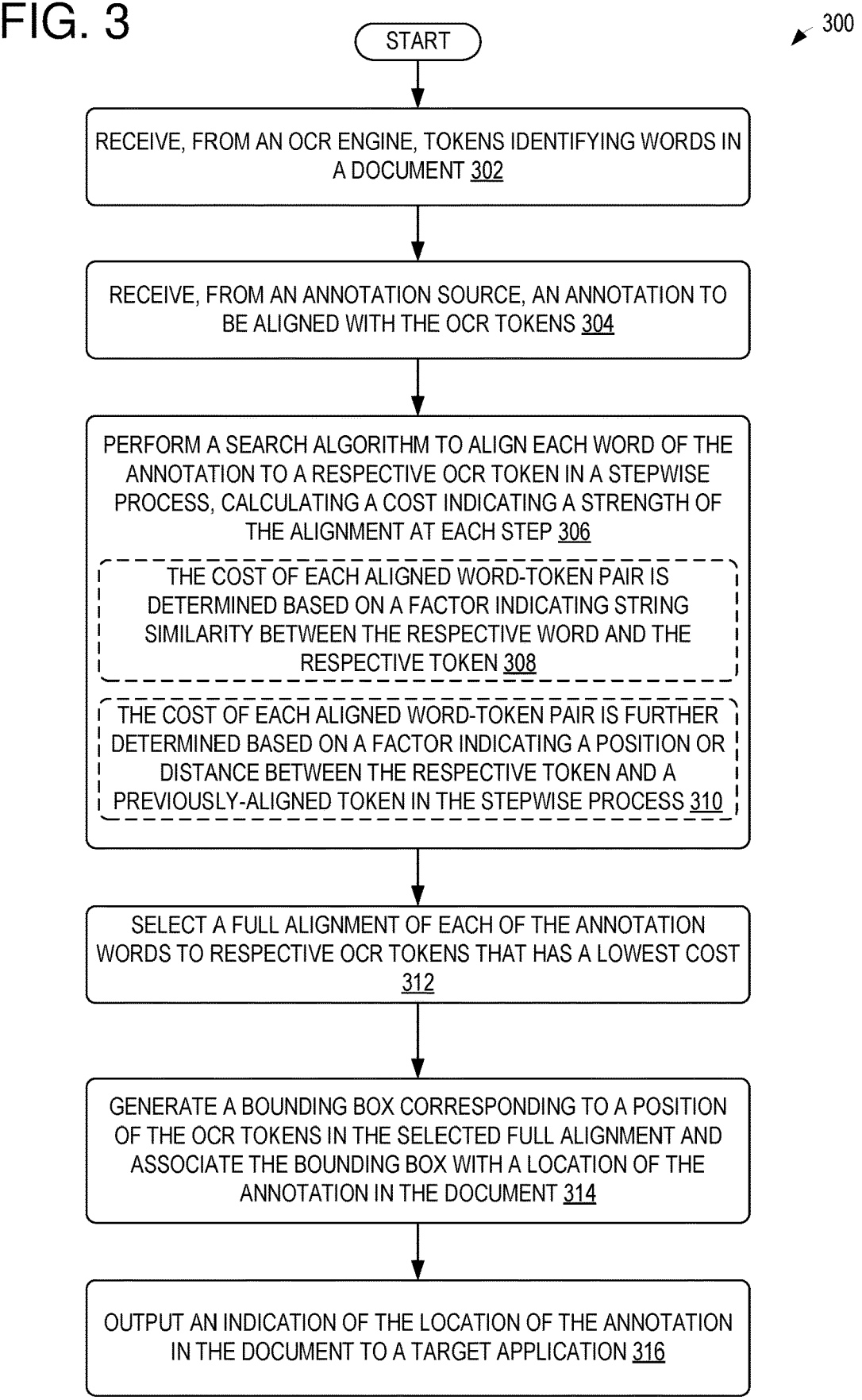
FIG. 3 is a flow chart of an example method for aligning OCR tokens with weak annotations in accordance with examples of the present disclosure.

FIG. 3 is a flowchart of an example method 300 for aligning OCR tokens with weak annotations in accordance with one or more examples of the present disclosure. For example, method 300 may be performed by one or more components of a system, such as a system 100 of FIG. 1. In some examples, method 300 may be performed by executing instructions of an annotation alignment service and/or other components described above with respect to FIGS. 1 and 2. At 302, the method includes receiving, from an OCR engine, tokens identifying words in a document. For example, as described above with respect to FIGS. 1 and 2, an OCR engine may output OCR tokens for words identified by the character recognition algorithms and processing.

At 304, the method includes receiving, from an annotation source, an annotation to be aligned with the OCR tokens. For example, the annotation may be a weak annotation, providing a block of text (e.g., one or more words) to be aligned with corresponding OCR tokens. As described above, such OCR tokens may not be aligned in the document in the same manner as the annotation when considering the entirety of the document as processed line-by-line.

Accordingly, at 306, the method includes performing a search algorithm to align each word of the annotation to a respective OCR token in a stepwise process, calculating a cost indicating a strength of the alignment at each step. As indicated at 308, the cost of each aligned word-token pair may be determined based on a factor indicating a string similarity between the respective word and the respective token. For example, each character of the annotation word that is different than the corresponding respective OCR token word may increase the cost by a set amount (e.g., a flat cost, such as 1 point increase for each different character, an accelerating cost such that each additional character difference increases the cost by a further amount, etc.) or a variable amount (e.g., by an amount that is based on a pixel/shape/contextual difference between the different characters, for example a character difference of I vs J would be assigned a lower cost than a difference of O vs Z). As a non-limiting example, the string similarity may be a Levenshtein distance (e.g., the minimum number of single-character edits (insertions, deletions or substitutions) required to change one word into the other). As indicated at 310, the cost of each aligned word-token pair may be further determined based on a factor indicating a position or distance between the respective token and one or more other tokens, such as a last-aligned token, all previously aligned tokens, and/or a subset of previously aligned tokens. For example, the position or distance may be a Euclidean distance in the document between the respective token and the one or more other tokens, a number of spaces/tokens between the respective token and the one or more other tokens, etc. As one example, the position or distance may be calculated as the minimum distance of the current token (e.g., a fourth aligned token) to each previous aligned tokens (e.g., first, second, and third aligned tokens), as represented by the following equation: min(dist(t1,t4), dist(t2,t4), dist(t3,t4)). Additional examples of the cost determinations are described in more detail below with respect to FIG. 4.

At 312, the method includes selecting a full alignment of each of the annotation words to respective OCR tokens that has a lowest cost. For example, a full alignment may include a full set of annotation word-OCR token pairs such that each annotation word in the annotation is aligned to a corresponding respective OCR token for the document without redundancy (e.g., the full alignment includes only one OCR token alignment for each word of the annotation and each word of the annotation is associated with a respective OCR token). As there may be multiple full alignments (e.g., full alignment sets) evaluated (as explained in more detail below with respect to the example of FIG. 4), the total cost for each full alignment may be compared to one another to determine a best fit (e.g., lowest total cost) alignment.

At 314, the method includes generating a bounding box corresponding to a position of the OCR tokens in the selected full alignment and associate the bounding box with a location of the annotation in the document. For example, the bounding box may be selected to be a smallest box that encloses all of the OCR tokens aligned with annotation words in the full alignment. At 316, the method includes outputting an indication of the location of the annotation in the document to a target application. Examples of target applications and uses of the annotation (now converted to a strong annotation) are described above.

Example Beam Search Process for Aligning Annotations to OCR Tokens

Figure 4:
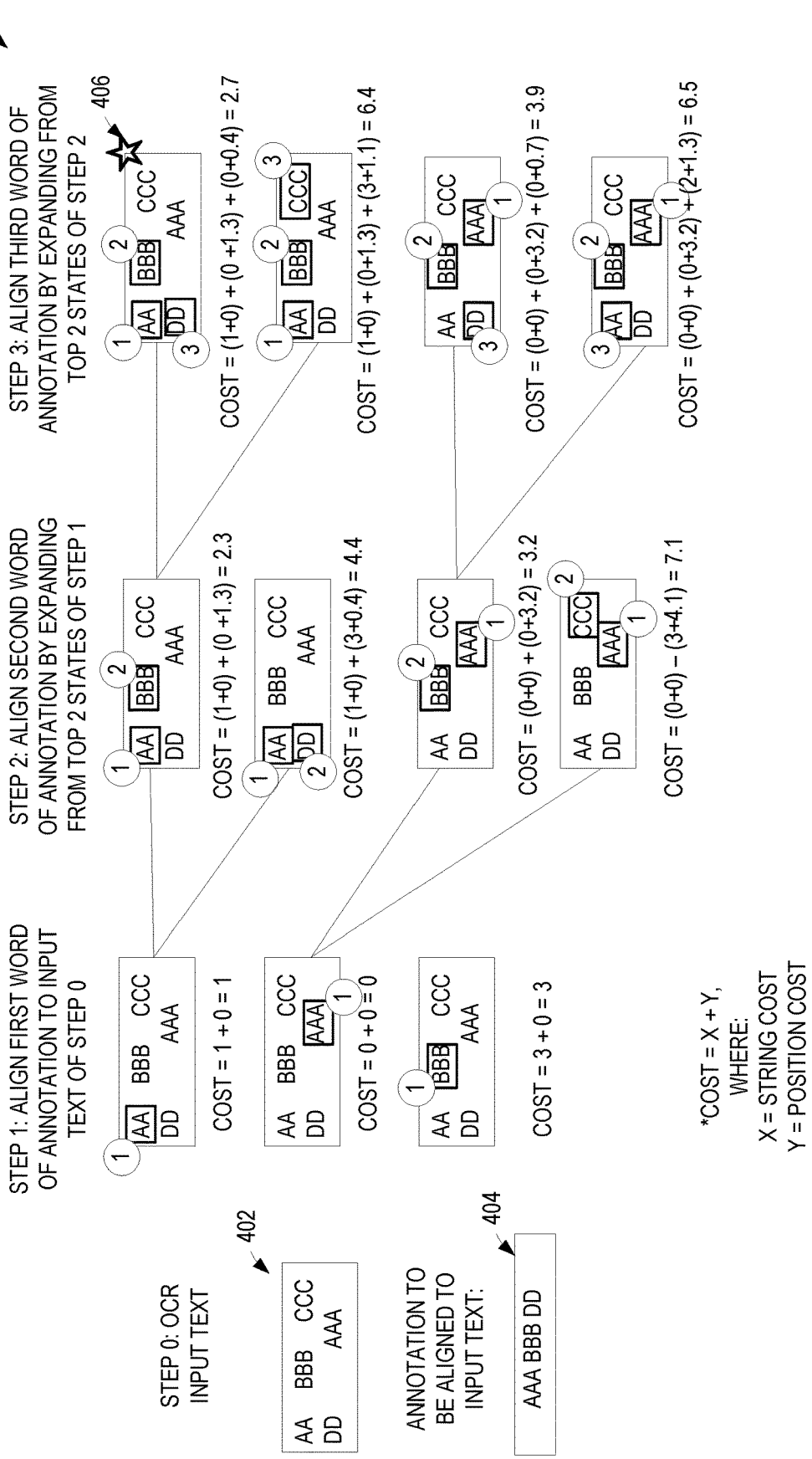
FIG. 4 is a schematic representation of a beam first search algorithm as applied to align OCR tokens with weak annotations in accordance with examples of the present disclosure.

FIG. 4 schematically shows an example process 400 for performing a beam search process (e.g., a best-first beam search process) to align annotations to OCR tokens. For example, the process 400 may be performed by the annotation alignment service 110 of FIG. 1 or annotation alignment service 210 of FIG. 2 to generate an alignment of OCR tokens to weak annotations. At step 0, OCR input text (e.g., OCR tokens) is shown at 402 to include the tokens "AA" "BBB" and "CCC" on a first line of a document and "DD" and "AAA" on a second line of a document. The weak annotation 404 to be aligned to the OCR tokens includes words "AAA" "BBB" and "DD."

At step 1, the first word of the annotation 404 ("AAA") is aligned to respective OCR tokens of the input text 402 and associated costs are determined including a string cost and position cost. The string cost may include factors that relate to a difference between the characters in the OCT token and the characters of the word of the annotation to which the OCT token is being aligned. In some examples, this may include a Levenshtein edit distance, which indicates how many edit operations are needed to change the current OCR word into the annotation word. The position cost may include factors that relate to a distance between the OCR token and a last or immediately-previously aligned OCR token (or all prior-aligned OCR tokens). In some examples, the position cost may be calculated as the minimum Euclidean distance between the bounding box of the current OCR token to all previously aligned OCR tokens. In some examples, one or more of the cost functions may be normalized to fall between 0 and 1 and a weighted sum of the different costs may represent the overall fitness of aligning the current OCR token to the corresponding annotation word.

In the illustrated example, "AAA" is first aligned with OCR token "AA" resulting in a cost of 1 (the sum of a string cost of 1 due to the lack of a third "A" in the OCR token and a position cost of 0; since this is the first word of the annotation, all alignment attempts will have a position cost of 0 as there is no prior-aligned word, except in examples where the position cost considers other factors, such as position in the line, position in the document, etc.). "AAA" is also aligned with the "AAA" OCR token, for a total cost of 0, and with the "BBB" OCR token for a total cost of 3 (due to the string cost of 3 resulting from the OCR token having three differing characters compared to the target weak annotation text of "AAA"). It is to be understood that additional alignments may be determined and considered as well in other examples, such as an alignment of "CCC" and "DD."

Accordingly, the cost of each alignment is compared to one another, and the alignments with the best two costs (e.g., the two lowest costs) are selected for expansion (e.g., continuing to perform alignment for a next word of the weak annotation 404). Thus in step 2, the second word of the annotation ("BBB") is aligned with respective OCR tokens, taking into account the distance from the first two alignments made for the first word of the annotation ("AAA") at step 1. As shown, this results in four new cost calculations for four next step alignment operations. As noted above, in some examples, additional cost calculations may be performed in some examples. As one such example, each of the previous alignments may be expanded to four new alignments. The first alignment of step 2 has a total cost of 2.3, which results from summing the cost of the prior alignment at step 1 with the cost of the alignment of "BBB" in the annotation with the "BBB" OCR token, where the position cost of "BBB" relative to "AA" is 1.3 reflecting the Euclidean distance between the respective bounding boxes for these two tokens. It is to be understood that the use of two lowest costs in the illustrative example is a non-limiting approach, and in other examples, the n lowest cost pairs may be used to progress to the next step, where n is an integer greater than 1. For example, annotation word-token pairs having the n lowest costs relative to each alignment performed at a given step (or a lowest-cost n number of annotation word-token pairs) may be used as alignment candidates for a next step, where the value of n, representing a beam size in the context of a beam search, may be selected by a user, set by default (e.g., based on a number of annotation words/tokens, a targeted precision, etc.), and/or selected by another process(es).

Step 3 includes performing a similar operation to step 2; selecting the top two performers cost-wise of the prior alignment selections and then expanding to align the last word of the annotation ("DD") and generating resulting costs. As shown by the star 406, the lowest cost full alignment is selected for generating a bounding box and outputting to a target application. Thus, the beam search algorithm explores multiple states at each step, and expands the states, selecting the best k (in the illustrated example, k=2) states for the next step, doing so iteratively until obtaining a target amount or number of terminal states. In some examples, an agenda is used to store all the states that will be expanded, which initially only includes the initial state where no annotation word is aligned yet. At each step, each state in the agenda is expanded by aligning the current annotation word to an OCR word that has not been aligned, and the overall cost so far is calculated, which is the overall cost of the previous state plus the incremental cost. Having gathered all the new states in a step, the states are then ranked by the cost, and the top-k ones (k is also called the beam size) are selected into the agenda for the next step. The process of expand→select is performed N times until reaching the terminal state with the minimal cost, and in this example, N is the number of words in the annotation, since at each step one annotation word is aligned.

To reduce the search space, in some examples, a heuristic is applied that not all OCR tokens are to be considered after the previous alignment (and/or after each step of alignment). For example, only the OCR tokens that are within the following x lines (e.g., where x=3 in a non-limiting example) of the last OCR token may be considered since the aligned OCR tokens are unlikely to be farther away from each other. In this way, a speed of the beam search algorithm may be increased by reducing the total number of alignments/steps performed while focusing on best (e.g., most likely and/or lowest-cost) candidates for alignment.

Example Process for Partially Aligning Annotations to OCR Tokens

Figure 5:
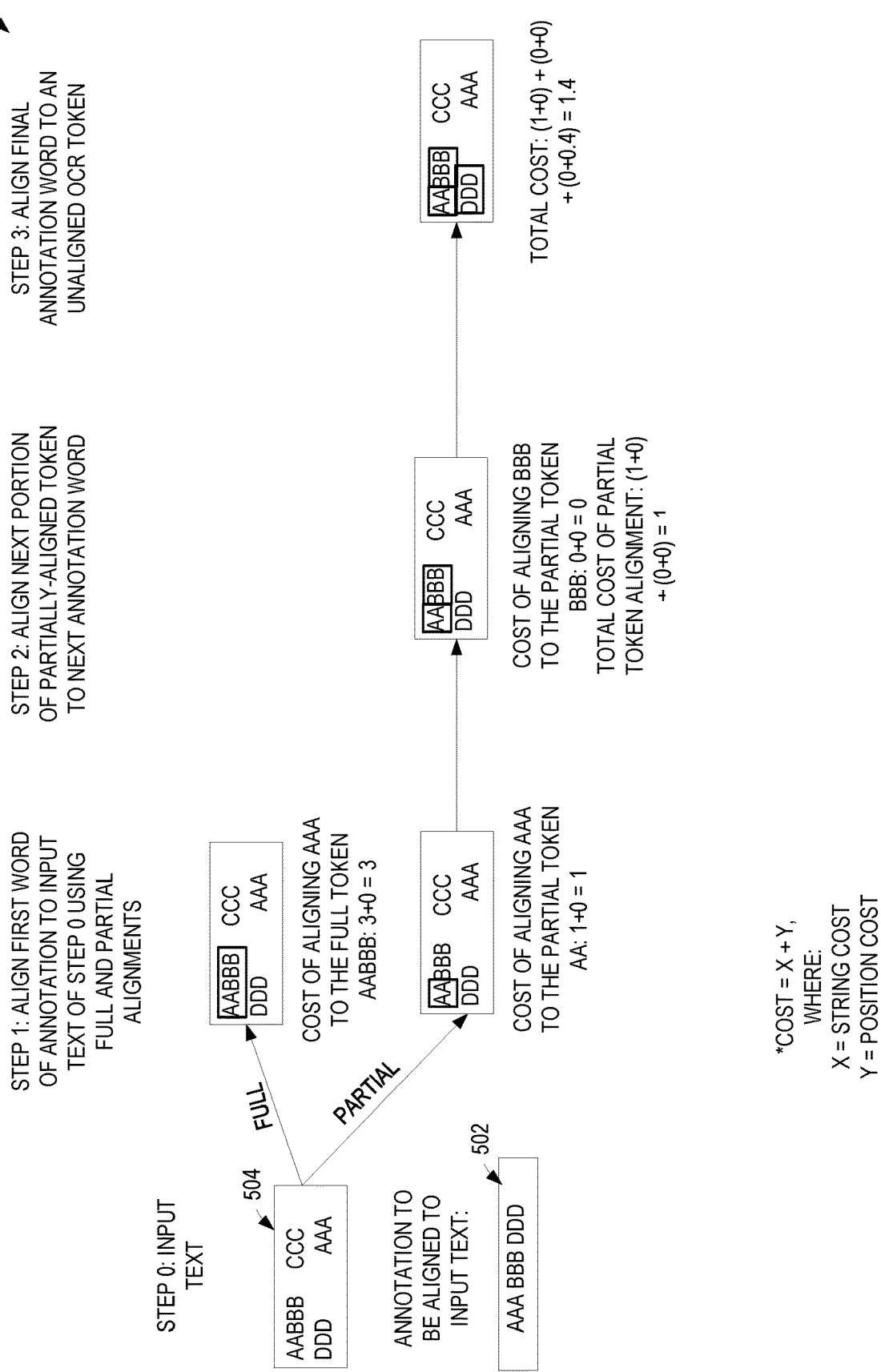
FIG. 5 is a schematic representation of partially aligning OCR tokens with weak annotations in accordance with examples of the present disclosure.

FIG. 5 schematically shows an example approach to aligning annotations at a subword level to partially align OCR tokens and annotations. For example, a basic word-level alignment method might face problems when the OCR words are tokenized differently than the annotation. For example, if the annotation in FIG. 2 includes the word "TERRACE" while the OCR engine spaces it out into two words ("TER" and "RACE") because of a spacing in an image of the document, the word-level alignment would first yield a high cost for "TERRACE"↔"TER", which would vastly increase the cost for the correct alignment, and potentially miss it.

Situations like this benefit from alignment on the subword level, so that a partial annotation word could be aligned to a partial OCR word (or a partial annotation word could be aligned to a full OCR word, or a full annotation word could be aligned to a partial OCR word, etc.), which could give more accurate cost estimation and avoid missing legitimate alignments.

In order to accommodate such partial alignment, in some examples, when creating the candidates for alignment, apart from creating a new state by aligning the two complete words (as in the word-level alignment), a new state may also be created which is either (a) aligning a prefix of the OCR word to the full annotation word or (b) aligning the full OCR word to a prefix of the annotation word, depending on which word is longer.

For the state with sub-word alignment, it may be defined that expansion must complete the sub-words before starting on a new word. For example, if the OCR word is a partial alignment, then the next alignment is conducted on the remaining part of the OCR word, i.e., no other OCR words are considered. Also, it may be ensured the Euclidean distance is calculated only once for each OCR word, i.e., when an OCR word is aligned in several segments, the Euclidean distance cost is only calculated in the first time.

FIG. 5 shows an example of one scenario 500 of partial alignment, in which a full annotation word 502 is aligned to a partial OCR token of OCR output 504. For example, as shown at step 1, a full alignment of word "AAA" of the annotation to word "AABBB" of the OCR token yields a cost of 3, whereas a partial alignment to just the prefix "AA" of the "AABBB" OCR token yields a cost of 1. Continuing after the partial alignment, as noted above, the next alignment at step 2 (for the next word in the annotation, "BBB") is targeted to the remainder of the OCR token in order to resolve the token before moving on to a new OCR token. In other examples, where a portion of the annotation is aligned with a full OCR token, the next alignment may not be restricted, since the full OCR token is resolved already. The subword, or partial, alignment described in FIG. 5 may provide an additional option for alignment processes, on top of the full alignment examples described herein. For example, for each state, there may exist one full alignment and potentially one or more partial alignments, resulting in an opportunity to find an equal or better solution than performing full alignment alone.

Example Process for Using Machine Learning to Enhance Alignment

The above examples may be most successful when annotation words to be aligned are relatively unique and/or include multiple characters. However, for shorter and/or more commonly-occurring annotation words, there may be multiple token matches within a document, which may create false positives when aligning the annotation words. For example, if an annotation word is the number "2," corresponding to a quantity of product listed in an invoice, such a word may be found in multiple points within a document (e.g., as a line/page number, partial address, etc.) that do not correspond to a quantity of a product. Another potential issue when aligning annotations to tokens is if an assumption is made that there is a 1:1 match of the annotation and its occurrence on the document page. For example, the supplier name of an invoice could appear multiple times on the page, and a weak annotation may have the same value only once, either to save annotation effort or because the stored value in the annotation source which is taken as ground truth annotation is single-valued. This would result in too few actual occurrences being considered, in other words, false negative matches. Both false positive and false negative annotations bring noise to model training that is based on weak-to-strong annotation conversions, misleading the model to make either false positive or false negative predictions. Therefore, in some examples, additional semantic/contextual information may be used to guide the search process.

For example, machine learning models may be leveraged to provide additional supporting information to disambiguate the semantics of the occurrences and allow many-to-many match between the annotations and the occurrences through filtering based on the model confidence. An example machine learning model encodes the context of each word as features to predict the label for the word. Using the above example of an annotation of "2" corresponding to a quantity of a product, occurrences of "2" in the column of "Quantity" of a document would receive high prediction confidence for an annotation label "lineitem.quantity", because the model has learned from the training data that the numbers under the header "Quantity" are likely to be "lineitem.quantity", in contrast to, for example, a number that follows the word "page." Accordingly, in some examples, the machine learning model that may associate words or locations in the document with a label for the annotation word.

The method is not dependent on the specific implementation of the machine learning model, provided that it can calculate a confidence score for a collection of OCR words (a possible matched occurrence of the annotation) for a given annotation's label. A straightforward implementation may involve calculating the confidence score for each word in the group concerning the label using a (token) classification model and then computing the average of these confidence scores.

An example method of implementing a machine learning process as described above to align the annotations of an example label "L" that appears n times in the document includes the following steps. First, all the annotations with the same unique strings of the label L are gathered, resulting in n' annotations (where n'≤n). For each of the n' annotations, the search-based alignment method described herein (e.g., with respect to FIGS. 1-5) is run, and at most b matched occurrences are collected (b is the beam size of the search method). An optional pre-defined threshold of the matching score can be used to pre-filter the occurrences, resulting in b' occurrences, where b'≤b. All occurrences across unique annotation strings may be gathered together (at most n×b) and sorted by the alignment score from the best match. With an initially empty candidate list, the occurrences may be sorted by the matching score and iterated over, and an occurrence may be added to the candidate list if the occurrence does not overlap (e.g., share OCR tokens) with any existing occurrences in the candidate list. This way, a non-overlapping list of occurrences with the best matching score may be obtained. The confidence score of each occurrence in the final candidates list may be calculated based on the machine learning model, and some may be filtered out based on a pre-defined confidence threshold. To avoid (potentially incorrect) low model confidence overly filtering the candidates, a minimum of n occurrences (the number of annotations for the label) may be guaranteed to be accepted, even if they don't exceed the confidence threshold. In order to seed the machine learning model, training data may be created without using the machine learning model approach described above, which is used to train the machine learning model, and then results of using the machine learning model with that seed data may be fed back in as further training data to continue improving the machine learning model iteratively in a bootstrap fashion. In some examples, previously-aligned strong annotations may be overwritten by more recently-aligned strong annotations as the machine learning model becomes more accurate through the training.

Further Implementation Examples

In some examples, the scoring/cost function described above may take into account other metrics. For example, if it is known that the annotation word (e.g., an invoice number) is found near another targeted word in the document (e.g., "Invoice Number:"), then a Euclidean distance to that other word may be a factor in the cost function. In other examples, selection of OCR tokens for aligning to an annotation word may be performed using a knowledge of a template/layout of the document, such that OCR tokens in a vicinity of a target region of the document associated with the content of the annotation word (e.g., address fields are typically in an upper left or upper right of the document, etc.) are scored lower (e.g., have a lower cost) than OCR tokens outside of the target region (or otherwise as a function of distance to the target region). Accordingly, in some examples, a cost may be based, at least in part, on a distance of a token in an annotation word-token pair to a target word or region in the document.

In some examples, a distance between OCR tokens may be precomputed or, once computed while performing a beam search algorithm, the distance may be stored/cached to avoid recalculating it in future executions. Similar caching/pre-computing may be performed for string similarities in order to provide even further computing resource cost/time delay reductions.

Example Advantages

This solution is superior in comparison of approaches in the past with regards to at least the following considerations. The disclosed approach considers the two-dimensional nature of documents being processed for character recognition, whereas prior approaches only considered one dimension (e.g., line-by-line characters). In this way, the disclosed approach can identify groups of characters that are aligned semantically, even if they are not aligned linearly. Generally, the solution described herein increases the accuracy of obtaining strong annotations from character recognition processes, and expands applicability of weakly annotated data by automatically generating such strong annotations (e.g., bounding boxes) for such weak annotations without human annotation efforts.

A Generalized Computer Environment

Figure 6:
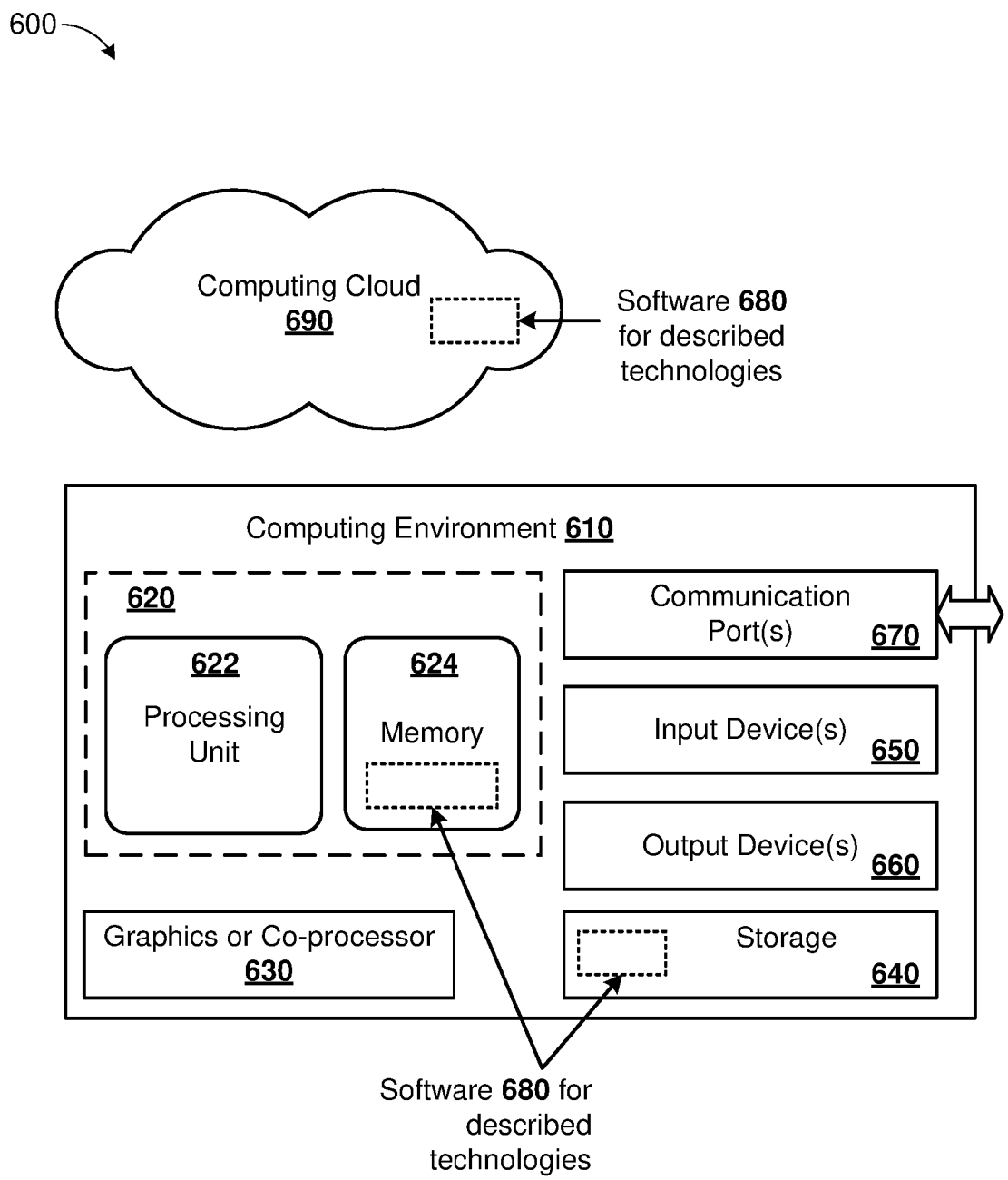
FIG. 6 is a diagram schematically depicting a computing environment suitable for implementation of disclosed technologies.

FIG. 6 illustrates a generalized example of a suitable computing system 600 in which described examples, techniques, and technologies, including performing search algorithms to align annotations to character recognition tokens according to disclosed technologies can be implemented. For example, the computing system 600 and/or one or more elements of the computing system 600 may include and/or be included within the described components of system 100 of FIG. 1 and/or be used to perform operations described in correspondence to FIGS. 2-5. The computing system 600 is not intended to suggest any limitation as to scope of use or functionality of the present disclosure, as the innovations can be implemented in diverse general-purpose or special-purpose computing systems.

With reference to FIG. 6, computing environment 610 includes one or more processing units 622 and memory 624. In FIG. 6, this basic configuration 620 is included within a dashed line. Processing unit 622 executes computer-executable instructions, such as for implementing any of the methods or objects described herein for performing annotation word-to-token alignment, or various other architectures, components, handlers, managers, modules, or services described herein. Processing unit 622 can be a general-purpose central processing unit (CPU), a processor in an application-specific integrated circuit (ASIC), or any other type of processor. In a multi-processing system, multiple processing units execute computer-executable instructions to increase processing power. Computing environment 610 can also include a graphics processing unit or co-processing unit 630. Tangible memory 624 can be volatile memory (e.g., registers, cache, or RAM), non-volatile memory (e.g., ROM, EEPROM, or flash memory), or some combination thereof, accessible by processing units 622, 630. The memory 624 stores software 680 implementing one or more innovations described herein, in the form of computer-executable instructions suitable for execution by the processing unit(s) 622, 630. The memory 624 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 610 can have additional features, such as one or more of storage 640, input devices 650, output devices 660, or communication ports 670. An interconnection mechanism (not shown) such as a bus, controller, or network interconnects the components of the computing environment 610. Typically, operating system software (not shown) provides an operating environment for other software executing in the computing environment 610, and coordinates activities of the components of the computing environment 610.

The tangible storage 640 can be removable or non-removable, and includes magnetic disks, magnetic tapes or cassettes, CD-ROMs, DVDs, or any other medium which can be used to store information in a non-transitory way and which can be accessed within the computing environment 610. The storage 640 stores instructions of the software 680

(including instructions and/or data) implementing one or more innovations described herein.

The input device(s) 650 can be a mechanical, touch-sensing, or proximity-sensing input device such as a keyboard, mouse, pen, touchscreen, trackball, a voice input device, a scanning device, or another device that provides input to the computing environment 610. The output device(s) 660 can be a display, printer, speaker, optical disk writer, or another device that provides output from the computing environment 610.

The communication port(s) 670 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 600 can also include a computing cloud 690 in which instructions implementing all or a portion of the disclosed technology are executed. Any combination of memory 624, storage 640, and computing cloud 690 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 7:
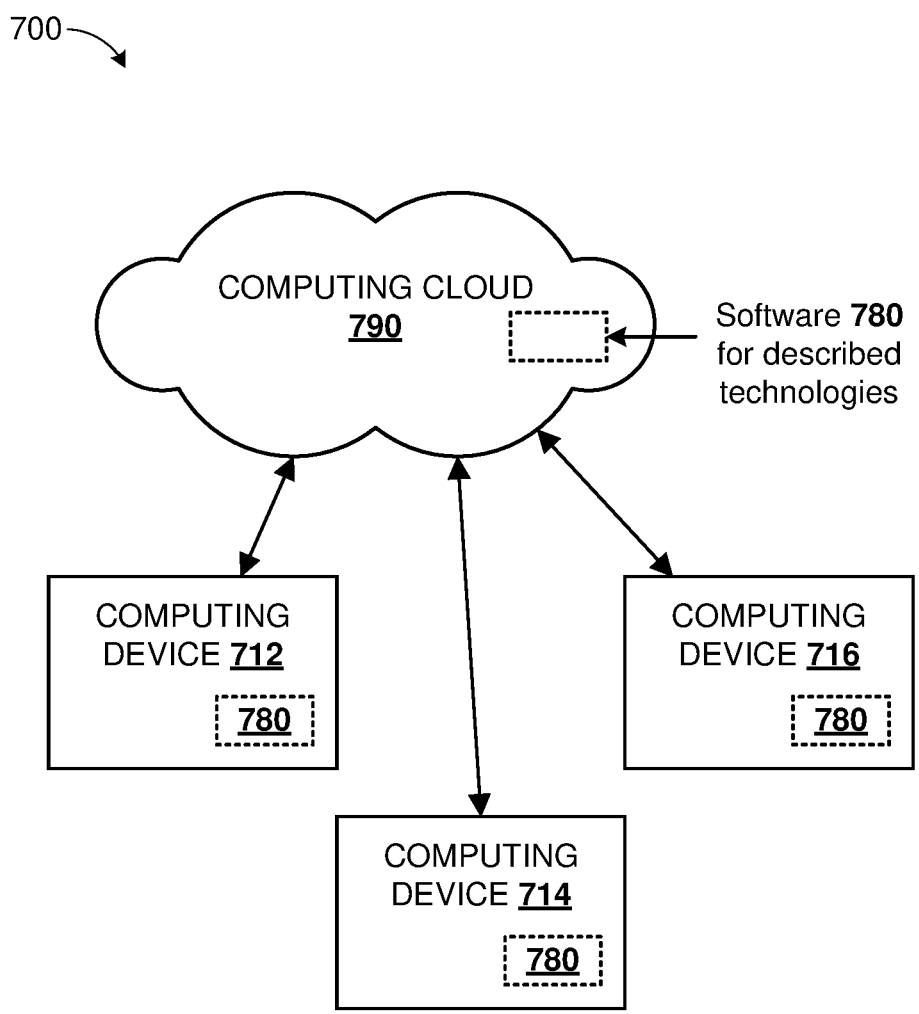
FIG. 7 is a diagram schematically depicting computing devices operating in conjunction with a computing cloud for implementation of disclosed technologies.

FIG. 7 depicts an example cloud computing environment 700 in which the described technologies can be implemented. For example, the computing environment 700 and/or one or more elements of the computing environment 700 may include and/or be included within the described components of system 100 of FIG. 1 and/or be used to perform operations described in correspondence to FIGS. 2-5. The cloud computing environment 700 comprises a computing cloud 790 containing resources and providing services. The computing cloud 790 can comprise various types of cloud computing resources, such as computer servers, data storage repositories, networking resources, and so forth. The computing cloud 790 can be centrally located (e.g., provided by a data center of a business or organization) or distributed (e.g., provided by various computing resources located at different locations, such as different data centers and/or located in different cities or countries).

The computing cloud 790 can be operatively connected to various types of computing devices (e.g., client computing devices), such as computing devices 712, 714, and 716, and can provide a range of computing services thereto. One or more of computing devices 712, 714, and 716 can be computers (e.g., servers, virtual machines, embedded systems, desktop, or laptop computers), mobile devices (e.g., tablet computers, smartphones, or wearable appliances), or other types of computing devices. Communication links between computing cloud 790 and computing devices 712, 714, and 716 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 712, 714, and 716 can also be connected to each other.

Computing devices 712, 714, and 716 can utilize the computing cloud 790 to obtain computing services and perform computing operations (e.g., data processing, data storage, and the like). Particularly, software 780 for performing the described innovative technologies can be resident or executed in the computing cloud 790, in computing devices 712, 714, and 716, or in a distributed combination of cloud and computing devices.

General Considerations

As used in this disclosure, the singular forms "a," "an." and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 624, and storage 640. The term computer-readable storage media does not include signals and carrier waves. In addition, the term computer-readable storage media does not include communication ports (e.g., 670) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing instructions which, when executed by one or more hardware processors, cause the hardware processors to perform actions that automatically generate annotation data usable in machine learning systems comprising:
   receiving, from a character recognition engine, tokens identifying recognized words in a document;
   receiving, from an annotation source, an annotation to be aligned with the tokens, the annotation comprising a plurality of annotation words;
   performing, in a stepwise process for the plurality of annotation words, a search algorithm to align each annotation word of the annotation to a respective token to form a respective annotation word-token pair, the stepwise process including calculating a respective cost indicating a strength of alignment of the respective annotation word-token pair at each step of the stepwise process based on a string similarity of the annotation word and the respective token in the pair and a position of the respective token within a two-dimensional layout of the document relative to a prior-aligned token in the stepwise process;
   selecting a full alignment set for the annotation comprising annotation word-token pairs for each annotation word of the annotation, the full alignment set being selected based on the respective costs of the annotation word-token pairs in the full alignment set;
   automatically generating a bounding box corresponding to a position of the tokens in the full alignment set in the document and associating the bounding box with a location of the annotation in the document; and
   outputting an indication of the location of the annotation in the document to a target application;
   wherein the stepwise process includes:
     generating multiple candidate alignment states at each step, each candidate alignment state comprising an intermediate set of annotation word-token alignments corresponding to a subset of the annotation words;
     selecting a subset of the candidate alignment states having lowest cost values; and
     iteratively repeating the generation and selection until obtaining a plurality of full alignment set in which each set comprises annotation word-token pairs for all annotation words of the annotation.

2. The one or more computer-readable media of claim 1, wherein the string similarity for the respective annotation word-token pair is determined as a Levenshtein distance between the annotation word and the respective token in the respective annotation word-token pair.

3. The one or more computer-readable media of claim 1, wherein performing the stepwise process includes determining the plurality of full alignment sets and associated total costs for annotation word-token pairs in each set in the plurality of full alignment sets, and wherein the selected full alignment set has a lowest total cost compared to each other set in the plurality of full alignment sets.

4. The one or more computer-readable media of claim 1, wherein the search algorithm includes a beam search algorithm.

5. The one or more computer-readable media of claim 4, wherein the beam search algorithm comprises a best-first beam search algorithm in which a lowest-cost n number of annotation word-token pairs are selected for expansion to perform a next step of the stepwise process, where n is an integer greater than 1.

6. The one or more computer-readable media of claim 4, further comprising applying a heuristic to determine tokens to be considered after each step of the stepwise process.

7. The one or more computer-readable media of claim 6, wherein the heuristic comprises considering tokens within x lines of a last-aligned token, where x is an integer greater than 1.

8. The one or more computer-readable media of claim 1, wherein performing the search algorithm comprises partially aligning annotations to tokens at a subword level.

9. The one or more computer-readable media of claim 1, wherein, for each respective annotation word-token pair, the cost is further based on a distance of the respective token in the pair to a target word in the document or a target region in the document.

10. The one or more computer-readable media of claim 1, wherein the target application comprises a machine learning model configured to accept strong annotations for documents to train the model.

11. The one or more computer-readable media of claim 1, wherein the bounding box is configured to be a smallest box that is able to enclose all of the tokens aligned with annotations words in the selected full alignment set.

12. The one or more computer-readable media of claim 1, wherein the respective costs are further based on a confidence score calculated using a machine learning model that associates words or locations in the document with a label for the annotation word.

13. A method performed by a computer for automatically generating annotation data usable in machine learning systems, the method comprising:
   receiving, from a character recognition engine, tokens identifying recognized words in a document;
   receiving, from an annotation source, an annotation to be aligned with the tokens, the annotation comprising a plurality of annotation words;
   performing a search algorithm to align the annotation words to the tokens in a stepwise manner wherein, at each step, an annotation word is aligned to one or more of the tokens, and a cost of each respective alignment is calculated, the cost being based on a string similarity between the annotation word and a respective token and a distance based on a two-dimensional layout of the document between the respective token and a respective previously-aligned token to a prior annotation word in the annotation;
   selecting a full set of annotation word-token pairs corresponding to the annotation based on a total cost of alignment for the selected full set;
   automatically generating a bounding box enclosing the tokens in the selected full set; and
   outputting, to a target application, an indication of the bounding box to indicate a position of the tokens in the selected full set within the document;
   wherein the stepwise process includes:
      generating multiple candidate alignment states at each step, each candidate alignment state comprising an intermediate set of annotation word-token alignments corresponding to a subset of the annotation words;
      selecting a subset of the candidate alignment states having lowest cost values; and
      iteratively repeating the generation and selection until obtaining a plurality of full alignment set in which each set comprises annotation word-token pairs for all annotation words of the annotation.

14. The method of claim 13, wherein, for a selected annotation word of the plurality of annotation words having a label L, the respective cost of the respective alignment of the selected annotation word to the one or more tokens is calculated based at least in part on a proximity to a selected word in the document associated with the label L.

15. The method of claim 14, wherein an association of the selected word in the document with the label L is determined by a machine learning model.

16. The method of claim 15, wherein the selected full set of annotation word-token pairs is fed back to train the machine learning model.

17. The method of claim 13, wherein the search algorithm comprises a best-first beam search algorithm in which a lowest-cost n number of annotation word-token pairs are selected for expansion to perform a next step, where n is an integer greater than 1.

18. A system, comprising:
   one or more hardware processors with memory coupled thereto;
   computer-readable media storing instructions executable by the one or more hardware processors that automatically generate annotation data usable in machine learning systems, the instructions comprising:
      first instructions to receive, from a character recognition engine, tokens identifying recognized words in a document;
      second instructions to receive, from an annotation source, an annotation to be aligned with the tokens, the annotation comprising a plurality of annotation words;
      third instructions to gather a first set of annotation words of the annotation having a label L;
      fourth instructions to perform a search algorithm to align the annotation words to the tokens in a stepwise manner wherein, at each step, an annotation word of the first set is aligned to one or more tokens to generate an alignment, and a cost of each respective alignment is calculated, the cost being based on a string similarity between the annotation word and a respective token of the one or more tokens and a distance based on a two-dimensional layout of the document between the respective token and a respective previously-aligned token to a prior annotation word in the annotation;
      fifth instructions to sort the first set of alignments based on the respectively calculated cost and iteratively add each alignment having a non-shared token to a list of occurrences for annotation words having the label L;
      sixth instructions to calculate a confidence score for each of the alignments in the list of occurrences based on an association of the respective token for each of the alignments to the label L using a machine learning model;
      seventh instructions to select a full set of annotation word-token pairs corresponding to the annotation based on a total cost of alignment for the selected full set and the confidence score for the alignments of the first set of annotation words;

eighth instructions to automatically generate a bounding box enclosing the tokens in the selected full set; and ninth instructions to output, to a target application, an indication of the bounding box to indicate a position of the tokens in the selected full set within the document;

wherein the stepwise process includes:
   generating multiple candidate alignment states at each step, each candidate alignment state comprising an intermediate set of annotation word-token alignments corresponding to a subset of the annotation words;
   selecting a subset of the candidate alignment states having lowest cost values; and
   iteratively repeating the generation and selection until obtaining a plurality of full alignment set in which each set comprises annotation word-token pairs for all annotation words of the annotation.

19. The system of claim 18, wherein the alignments having a confidence score below a threshold are filtered out before selecting the full set of annotation word-token pairs.

20. The system of claim 18, wherein performing the search algorithm further comprises applying a heuristic to determine tokens to be considered after each step, and wherein the heuristic comprises considering tokens within x lines of a last-aligned token, where x is an integer greater than 1.

* * * * *